United States Patent [19]
Baker

[11] 3,991,205
[45] Nov. 9, 1976

[54] INHIBITING GROWTH OF BACTERIA AND FUNGI WITH t-BUTYL 2,4,5-TRICHLOROPHENYL CARBONATE

[75] Inventor: Don R. Baker, Orinda, Calif.

[73] Assignee: Stauffer Chemical Company, Westport, Conn.

[22] Filed: Oct. 20, 1975

[21] Appl. No.: 623,698

[52] U.S. Cl. .................................. 424/301; 21/58
[51] Int. Cl.² ..................... A01N 9/24; A01N 9/30; A61L 13/00
[58] Field of Search ............... 424/301; 21/2.7 R, 58

[56] References Cited
UNITED STATES PATENTS

| | | | |
|---|---|---|---|
| 2,510,025 | 5/1950 | Moyle | 424/301 |
| 2,912,378 | 11/1959 | Bernard | 21/2.7 R |
| 3,124,608 | 3/1964 | Schisla et al. | 424/301 |
| 3,148,203 | 9/1964 | Schisla et al. | 424/301 |
| 3,198,733 | 8/1965 | Pera et al. | 424/301 |

FOREIGN PATENTS OR APPLICATIONS 466,997   10/1968   Japan ................................ 424/301

OTHER PUBLICATIONS

Bennett et al., "Sensitivity of . . . Agents", Producers Monthly, pp. 18 & 19, 11–58.

*Primary Examiner*—Morris O. Wolk
*Assistant Examiner*—Bradley Garris
*Attorney, Agent, or Firm*—Edith A. Rice

[57] ABSTRACT

The growth of fungi and bacteria, including sulfate reducing bacteria, is inhibited by applying an effective amount of t-butyl 2,4,5-trichlorophenyl carbonate.

3 Claims, No Drawings

INHIBITING GROWTH OF BACTERIA AND FUNGI WITH T-BUTYL 2,4,5-TRICHLOROPHENYL CARBONATE

DETAILED DESCRIPTION OF THE INVENTION

This invention relates to a method of inhibiting the growth of bacteria and fungi by applying thereto t-butyl 2,4,5-trichlorophenyl carbonate.

t-Butyl 2,4,5-trichlorophenyl carbonate is a known compound and one method for its preparation is described in an article by W. Broadbent, J. S. Morley and B. E. Stone in the *Journal of the Chemical Society* (C), 1967 pages 2632–2637. Briefly, in this method a solution of phosgene in toluene is treated with 2,4,5-trichlorophenol at −10° C, followed by addition of dimethylaniline at such a rate that the reaction temperature is maintained at 5°–10° C. The mixture is heated to 20°–24° C and maintained at this temperature for 12 hours. The mixture is cooled by addition of ice and the suspension filtered. From the organic layer in the filtrate, 2,4,5-trichlorophenyl chloroformate is isolated. A solution of the crude 2,4,5-trichlorophenyl chloroformate in methylene chloride is reacted with a solution of t-butanol and quinoline in methylene chloride. The reaction mixture is maintained at 20°–24° C for 12 hours. The mixture is cooled by addition of ice and the suspension is filtered. From the organic layer in the filtrate t-butyl 2,4,5-trichlorophenyl carbonate is isolated.

The following tests illustrate the microbiological activity of t-butyl 2,4,5-trichlorophenyl carbonate.

In Vitro Agar Screening Tests

This test measures the bactericidal and fungicidal properties of a compound when in contact with growing bacteria or fungi in an artificial medium. The test is conducted by adding 20 ml portions of a suitable warm sterile agar solution into 20 × 100 mm Petri dishes. The test compound is then added at levels of 1, 5, 10 and 50 μg/ml and mixed with the warm mobile agar solution. The treated agar mixture is then allowed to come to room temperature and solidify. Cells of the chosen organism are streaked on the surface of the solidified agar and are then incubated for such lengths of time that untreated samples containing no toxicant show luxurious growth typical of the particular organism. This time varies from 24 hours to one week depending on the particular organism. The fungi are incubated at 30° C and the bacteria are incubated at 37° C. Nutrient agar is used as the medium in this test for the bacteria. Potato dextrose agar is used as the medium for the fungi with the exception of *Trichophyton mentagrophytes* for which Emmons agar is used.

The extent of growth is noted at the end of the incubation period.

Table I shows the minimum inhibiting concentration, in μg/ml, of t-butyl 2,4,5-trichlorophenyl carbonate required for control of the organisms listed.

Table I

| | Organism | Minimum Inhibiting Concentrations μg/ml |
|---|---|---|
| BACTERIA: | *Pseudomonas aeruginosa* | >50 |
| | *Enterobacter aerogenes* | 10 |
| | *Bacillus cereus* | 50 |
| | *Brevibacterium* | 50 |

Table I-continued

| | Organism | Minimum Inhibiting Concentrations μg/ml |
|---|---|---|
| | *ammoniagenes* | |
| | *Staphylocuccus aureus* | 10 |
| | *Escherichia coli* | 50 |
| FUNGI: | *Aureobasidium pullulans* | 50 |
| | *Trichophyton mentagrophytes* | (5) |
| | *Aspergillus oryzae* | (10) |
| | *Aspergillus niger* | 10 |
| | *Aspergillus fumigatus* | 50 |
| | *Aspergillus flavus* | 50 |
| | *Penicillium italicum* | 50 |
| | *Penicillium sp.* | 50 |
| | *Penicillium expansum* | 50 |
| | *Rhizopus stolonifer* | 50 |

( ) indicates partial control at this concentration, complete control at next higher concentration
> indicates greater than

Sulfate Reducing Bacteria in Vitro Test

This test measures the bactericidal properties of a compound when in contact with a sulfate reducing bacteria, specifically *Desulfovibrio desulfuricans*. The test is conducted by dissolving the test compound in acetone to give an 0.5% solution. This toxicant is added to vials containing sterile Sulfate API broth with tryptone under anaerobic conditions at such levels to give final toxicant concentrations of 1, 5, 10 and 50 μg/ml of solution. An inoculant solution of 0.5 ml of the growing organism, *Desulfovibrio desulfuricans*, is added to the vials followed by sufficient sterile distilled water to give a total of 10 ml of solution in the vials. The vials are incubated at room temperature for 3 to 5 days until untreated controls show growth of the organism as indicated by the black color development in the vials.

The minimum inhibiting concentration of t-butyl 2,4,5-trichlorophenyl carbonate required for control of the sulfate reducing bacteria is 5 μg/ml.

Mixed Culture Sulfate Reducing Bacteria In Vitro Test

This test measures the bactericidal properties of a compound when in contact with a mixed culture of sulfate reducing bacteria isolated from an oil well. The test is conducted by dissolving the test compound in acetone to give an 0.5% solution. This toxicant is injected into vials containing sterile sulfate broth and an iron nail under anaerobic conditions at such levels to give final toxicant concentrations of 1, 5, 10 and 50 μg/ml of solution. An innoculant solution of 0.5 ml of the growing mixed culture of sulfate reducing bacteria is added to the vials followed by sufficient sterile distilled water to give a total of 10 ml of solution in the vials. The vials are incubated at room temperature for one week until controls show growth as indicated by black color development in the vials.

The minimum inhibiting concentration of t-butyl 2,4,5-trichlorophenyl carbonate required for control of the mixed culture of sulfate reducing bacteria is 5 μg/ml.

As can be seen by the test results, t-butyl 2,4,5-trichlorophenyl carbonate possesses bactericidal and fungicidal activity. It can be applied to bacteria and fungi to be controlled in a variety of ways at various concentrations. If desired, it can be combined with suitable carriers and applied as dusts, sprays, or drenches. The amount applied will depend on the nature of the intended microbiological use.

Among the various microbiological uses of t-butyl 2,4,5-trichlorophenyl carbonate is the control of slime-forming microorganisms whose growth is a problem in aqueous systems such as lagoons, lakes, ponds, pools, cooling water systems, and pulp and paper mill systems. Such control is achieved by adding t-butyl 2,4,5-trichlorophenol carbonate to the particular system in a quantity adequate to control the slime-forming microorganisms.

Since t-butyl 2,4,5-trichlorophenyl carbonate is effective against sulfate reducing bacteria it can also be used to inhibit the growth of sulfate reducing bacteria present in industrial "process water". By "process water" is meant fresh water, slightly saline water, sea water, or concentrated brines, which are utilized in or result from various industrial processes and which because of their source, mode of storage or utilization, operate as culture media for sulfate reducing bacteria. The sulfate reducing bacteria generally include the species *Desulfovibrio desulfuricans*, *Desulfovibrio orientis*, *Clostridium nigrificans*. Of these, the first is most prevalent.

Typical industrial systems employing process water are metallurgical operations employing cutting oils, latex paint preparation and storage, oil production including subsurface disposal of water withdrawn from wells and water used to repressurize wells for secondary oil recovery, packing fluids employed as "dead" layers in the casing of "multiple completion" oil well systems, and neutral drilling mud systems. In general, any process water which remains quiscent or under reduced rate of flow is subject to growth of sulfate reducing bacteria.

The harmful effects of growth of these bacteria are enormous. In oil production, for example, the bacteria cause injection well plugging and corrosion of iron and steel pipes and equipment, necessitating expensive shut-down for cleaning. Using the oil as their carbon source, the bacteria reduce sulfate ion to hydrogen sulfide ("sour gas") which in turn reacts with iron to form black particles of suspended iron sulfide. These particles clog the injection system and the once water-permeable oil-bearing formations. The bacteria are often the sole cause of pitting type corrosion of drilling equipment, either by acting as cathode depolarizers or by producing corrosive hydrogen sulfide, but more often they accelerate corrosion. See A. W. Baumgartner, "Sulfate-Reducing Bacteria . . . Their Role in Corrosion and Well Plugging," presentation at West Texas Oil Lifting Short Course, Texas Technological College, Lubbock, Texas, Apr. 21–22, 1960.

What is claimed is:

1. A method of inhibiting the growth of bacteria which comprises applying thereto an effective amount of t-butyl 2,4,5-trichlorophenyl carbonate.
2. The method of claim 1 wherein the bacteria is sulfate reducing bacteria.
3. The method of claim 2 wherein the bacteria is *Desulfovibrio desulfuricans*.

* * * * *